US007340311B2

(12) United States Patent
Landis et al.

(10) Patent No.: US 7,340,311 B2
(45) Date of Patent: Mar. 4, 2008

(54) ELECTRICAL PANEL ACCESS AND CONTROL APPARATUS INCLUDING TRUE EMERGENCY STOP AND POWER BUSS LOCKOUT

(76) Inventors: Richard Landis, 8905 Cologne, Sterling Heights, MI (US) 48314; Anthony Moceri, 6056 Hunters Ridge, Washington Township, MI (US) 48094

( * ) Notice: Subject to any disclaimer, the term of this patent is extended or adjusted under 35 U.S.C. 154(b) by 1214 days.

(21) Appl. No.: 10/101,674

(22) Filed: Mar. 19, 2002

(65) Prior Publication Data

US 2003/0178893 A1 Sep. 25, 2003

(51) Int. Cl.
*G05B 11/01* (2006.01)
*G05B 9/02* (2006.01)
*G05B 15/00* (2006.01)

(52) U.S. Cl. ................................ 700/17; 70/79; 70/83

(58) Field of Classification Search .................. 700/17, 700/79, 83

See application file for complete search history.

(56) References Cited

U.S. PATENT DOCUMENTS

| | | | | |
|---|---|---|---|---|
| 4,073,000 | A * | 2/1978 | Krejsa | 361/616 |
| 4,194,100 | A | 3/1980 | Cox et al. | 200/50 |
| 4,194,181 | A | 3/1980 | Brundage | 340/286 R |
| 4,206,784 | A | 6/1980 | Phillips | 138/92 |
| 4,767,347 | A | 8/1988 | Kamp et al. | 439/133 |
| 4,769,739 | A | 9/1988 | De Bruin | 361/335 |
| 5,077,631 | A * | 12/1991 | Cleary | 361/192 |
| 5,136,463 | A | 8/1992 | Webster | 361/334 |
| 5,196,831 | A * | 3/1993 | Bscheider | 340/638 |
| D337,311 | S | 7/1993 | Perzan et al. | D13/160 |
| 5,233,511 | A * | 8/1993 | Bilas et al. | 700/17 |
| 5,274,781 | A | 12/1993 | Gibart | |
| 5,414,584 | A | 5/1995 | Young | 361/115 |
| 5,419,165 | A | 5/1995 | Perkins | 70/14 |
| 5,479,618 | A | 12/1995 | Van de Steeg et al. | |
| 5,628,534 | A | 5/1997 | Morgan | 292/128 |
| 5,762,224 | A | 6/1998 | Benn et al. | 220/402 |
| 5,874,787 | A | 2/1999 | Meyer et al. | |
| 5,892,449 | A * | 4/1999 | Reid et al. | 340/639 |

(Continued)

OTHER PUBLICATIONS

ElectroGuard™ Safety Isolation System, Bulletin 2030. Jan. 20, 2004, 33 pgs., Allen-Brady.

*Primary Examiner*—Ronald Hartman, Jr.
(74) *Attorney, Agent, or Firm*—Brooks Kushman P.C.

(57) ABSTRACT

An improved electrical panel design provides a modular, power-reliable, buss-lockout and true emergency-stop capabilities. Through the use of an interface, the approach eliminates numerous outdated, if not antiquated, parts, including safety locks, mechanical disconnect switches, E-stop safety relays, and safety Programmable controllers. The modular panel design saves interior panel space, permitting the use of single-door access, in some cases. Panel doors cannot be opened with live electricity without some form of electronic authorization, and a record of access is stored for future reference. Power may not then be reactivated with the doors opened, thereby virtually eliminating disconnect related accidents. Automatic shut down further occurs with a plant network emergency, ground-fault interruption, or panel door violation. Other benefits of the approach include the capability of local programming through an RS-232 or other plant network, visual (color) display of system status and diagnostic display in conjunction with card/code lock-out access. The invention may be deployed in any number of environments, including a wide variety of industrial applications, such as factory lines, loading docks, and so forth.

39 Claims, 5 Drawing Sheets

U.S. PATENT DOCUMENTS

| | | | | | |
|---|---|---|---|---|---|
| 5,914,666 | A | | 6/1999 | Zingsheim et al. | |
| 5,970,437 | A | | 10/1999 | Gorman et al. | |
| 6,037,857 | A | | 3/2000 | Behrens et al. | |
| 6,038,516 | A | * | 3/2000 | Alexander et al. | 702/67 |
| 6,067,483 | A | * | 5/2000 | Fesmire et al. | 700/296 |
| 6,222,448 | B1 | * | 4/2001 | Beck et al. | 340/506 |
| 6,366,301 | B1 | | 4/2002 | Thomas et al. | |
| 6,442,452 | B1 | * | 8/2002 | Kopke | 700/292 |

* cited by examiner

ELECTRICAL PANEL ACCESS AND CONTROL APPARATUS INCLUDING TRUE EMERGENCY STOP AND POWER BUSS LOCKOUT

FIELD OF THE INVENTION

This invention relates generally to electrical panels and, in particular to an improved electrical panel configuration providing genuine emergency-stop, power buss lock-out, and other capabilities.

BACKGROUND OF THE INVENTION

Various standards exist in relation to electrical panels and control functions, including the ANSI Control Reliability Standard, ANSI-B11.10. This standard has been in place for many years, and has yet to be truly modernized. One reason is that, since traditional systems function adequately in most circumstances, there is little incentive to introduce the latest technologies, particularly in view of that fact that these systems involve safety-related functions.

One area in need of updating, for example, is the "Lock-Out" function, which simply refers to the right of one individual to lockout others from reinstating power to equipment while they work on that equipment. This is a safety measure, similar to "pulling a meter" on a residence or business. The switches associated with this function are lockable, typically with a padlock, thereby informing maintenance personnel that the panel is now dead. There are times when the reverse is required; that is, where as a trades-person needs to work on a live panel. This is achieved by turning the power back on once the door is open. Switching power on with the door open can, and has, caused personnel injuries.

The disconnect switch is mechanically coupled to a pull-down handle used to interrupt power to the entire panel. A mechanical lock, such as a padlock is installed on the disconnect handle when the handle is pulled down. Although this arrangement now meets consensus standards, but is often not followed and is very inconvenient.

Another area in need of improvement is the emergency stop or "E-Stop" used to interrupt power provided by such panels to certain pieces of equipment, as might be found on the factory floor. For many years, such emergency stopping was accomplished with a master relay wired to interrupt power, much like a switch controlling a saw. One problem with such an arrangement is that if someone running a saw presses the E-Stop button, the starter contacts are welded closed due to a short circuit. This would be considered a system failure and the E-Stop button will not work as intended. The button itself. may be defective, thus, the very purpose of having an E-Stop is defeated. The inability of the E-button to perform as anticipated can result in a very dangerous situation, including the possible loss of life.

Most E-Stop configurations today follow a consensus standard of control reliability requiring redundant switches that are self-checking, adding a very high level of reliability to the control side of the circuit. This is accomplished through the use of safety relays. However, even using the most recent technology, known as safety PLCs, the potential power remains. Also in many situations the emergency stop button is used to halt the flow of electricity for non-emergency reasons, such as operator break periods.

A further need of improvement is panel access in general. Currently anyone can obtain access to a control panel; all that is needed is a screwdriver to open the panel door. Many mechanical door interlocks are broken and require no tools to open panel doors. In many factories people use these private areas to put their lunches, radios, and other personnel items in live control panels containing typical 480-volt, 3-phase power. Nevertheless, traditional panel door hardware techniques are employed.

Accordingly, the need remains for an improved electrical panel access and control technology, preferably one which includes true emergency stop, automated power buss lockout, and other advanced functions.

SUMMARY OF THE INVENTION

This invention improves upon existing electrical panel designs by providing a modular, power-reliable, buss-lockout and emergency-stop device. In broad and general terms, the approach moves control reliability to the power side of machinery and opposed to the control side.

The invention provides safety for skilled tradespersons required to work on machines or in electrical control panels while, at the same time, providing a true emergency or E-stop function, in the sense that externally derived control or electronic signals, such as single or multiple channel coded wave-forms, are used to disconnect the line from the load through an operator interface, thereby preventing power from being routed to the machinery where a problem might exist.

In contrast to existing systems, the inventive approach strives to interrupt power altogether by disconnecting the potential, so that power cannot be routed to devices such as motors, solenoids, drives, power-supplies etc. It is further recommended that machines or systems using the invention support two levels of stop buttons, one for ordinary "controls stop" as stated in the Background, and in the event of a true emergency, those labeled "E-Stop" according to this invention. Through the use of an electronic or electro-mechanical interface, the approach eliminates numerous outdated, if not antiquated, parts, including safety locks, mechanical disconnect switches, E-stop safety relays, and safety PLCs.

In addition, a modular panel design saves interior panel space, permitting the use of single-door access, in some cases. In the preferred embodiment, control panel doors cannot be opened with live electricity without some form of electronic authorization. The preferred embodiment further includes a records access capability if the panel is left unattended. The power may not then be reactivated with the doors opened, thereby virtually eliminating disconnect related accidents. In addition to the remote E-stop capability, automatic shut down will occur with a plant network emergency, ground-fault interruption, or panel door violation.

Other benefits of the approach include the capability of local programming through an RS-232 or other plant network, visual (color) display of system status and diagnostic display in conjunction with card/code lock-out access. This approach presumes a remote interface may be used in conjunction with a primary interface unit. The invention may be deployed in any number of environments, including a wide variety of industrial applications, such as factory lines, loading docks, and so forth.

DETAILED DESCRIPTION OF THE INVENTION

Reference will now be made to FIGS. 1-5, which illustrate different aspects of the preferred embodiment of this invention.

Figure 1:
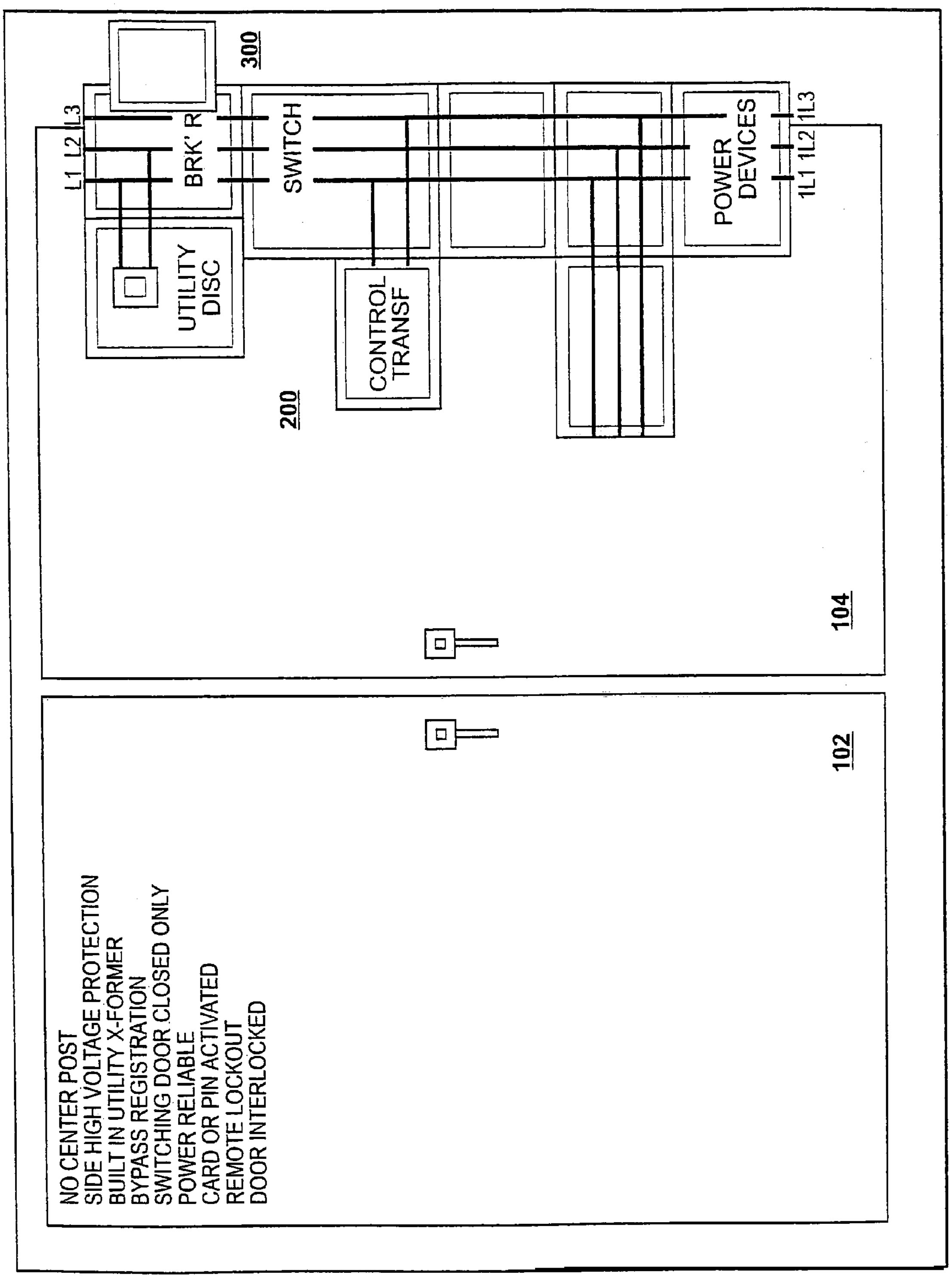
FIG. 1 is a simplified drawing of an electrical panel constructed in accordance with this invention.

FIG. 1 is a simplified drawing of an electrical panel constructed in accordance with this invention, which illustrates two panel doors 102, 104 and a human interface shown generally at 300. Although two doors 102, 104 are depicted in the drawing, due to the modular nature of the invention, including desegregation of control and power functions, it will be appreciated by one of skill in the art that a single-door design may be utilized. Even in the case of a two-door unit, no center post is required, since all high-voltage components are preferably mounted on a vertical rail relative to the interface 300, as described in further detail below.

Figure 2:
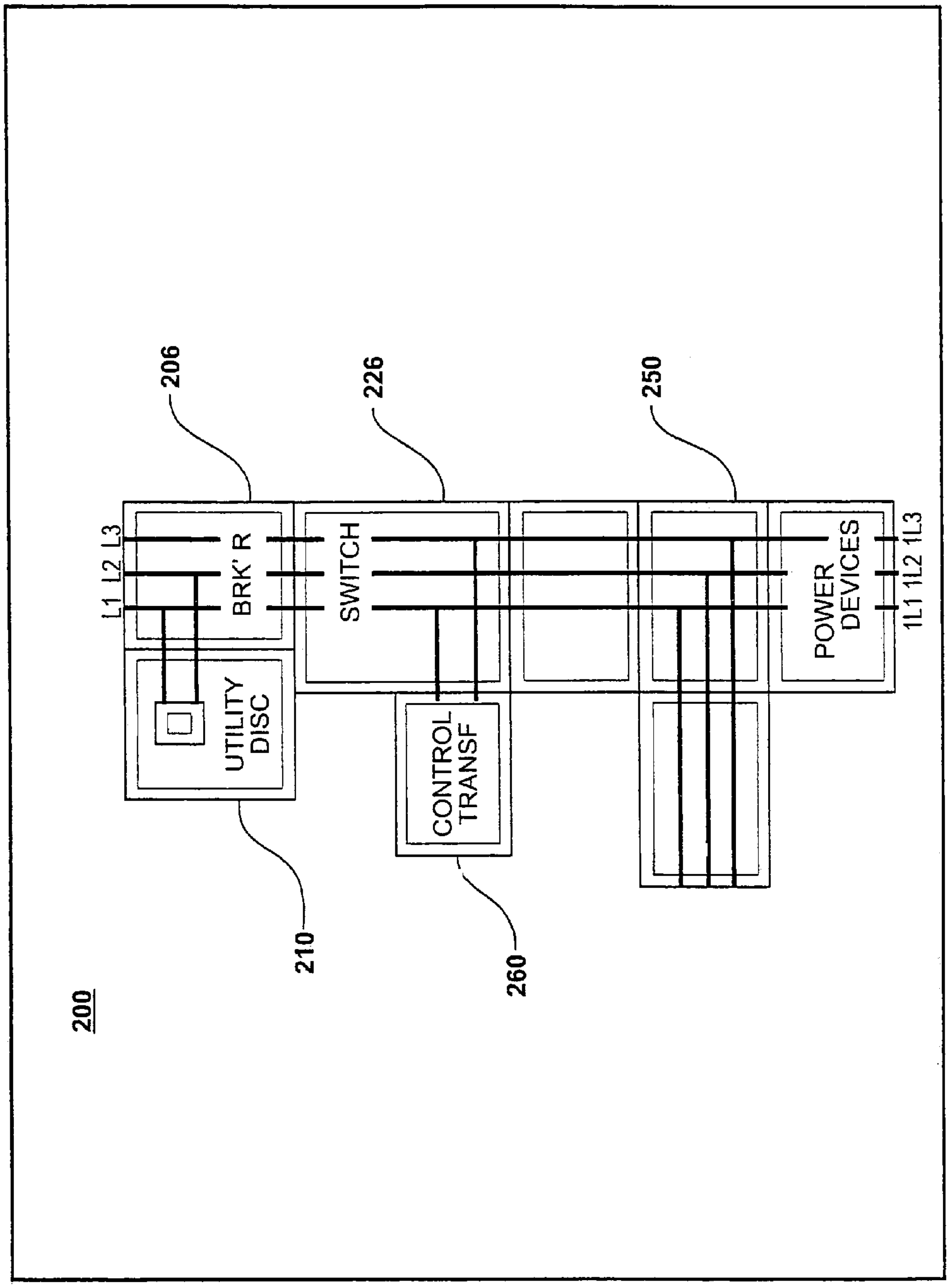
FIG. 2 is a block diagram of the modular power buss.

The preferred embodiment of the invention incorporates a modular power bus, is a simplified block diagram of which is depicted generally at 200 in FIG. 2. A line-side circuit breaker 206 provides the system with short-circuit and withstand protection. Also on the line-side of the system is a utility transformer and disconnect switch 210, which provides power to the interface and panel utilities such as outlets and panel lighting. The switch 226 is the center of the control architecture, being the focus of lock-out, by-pass and E-stop functions, as described previously. The control transformer 260 is located on the load side of the switch, being isolated from the voltage potential, along with any power devices 250 chosen to ride on the power buss. Note that the power buss is sized based on the load and rating of switch 226. In addition, the electrical modules which connect to the power bus preferably make connection by snapping onto and over the buss itself, for a finger-safe configuration.

Figure 3:
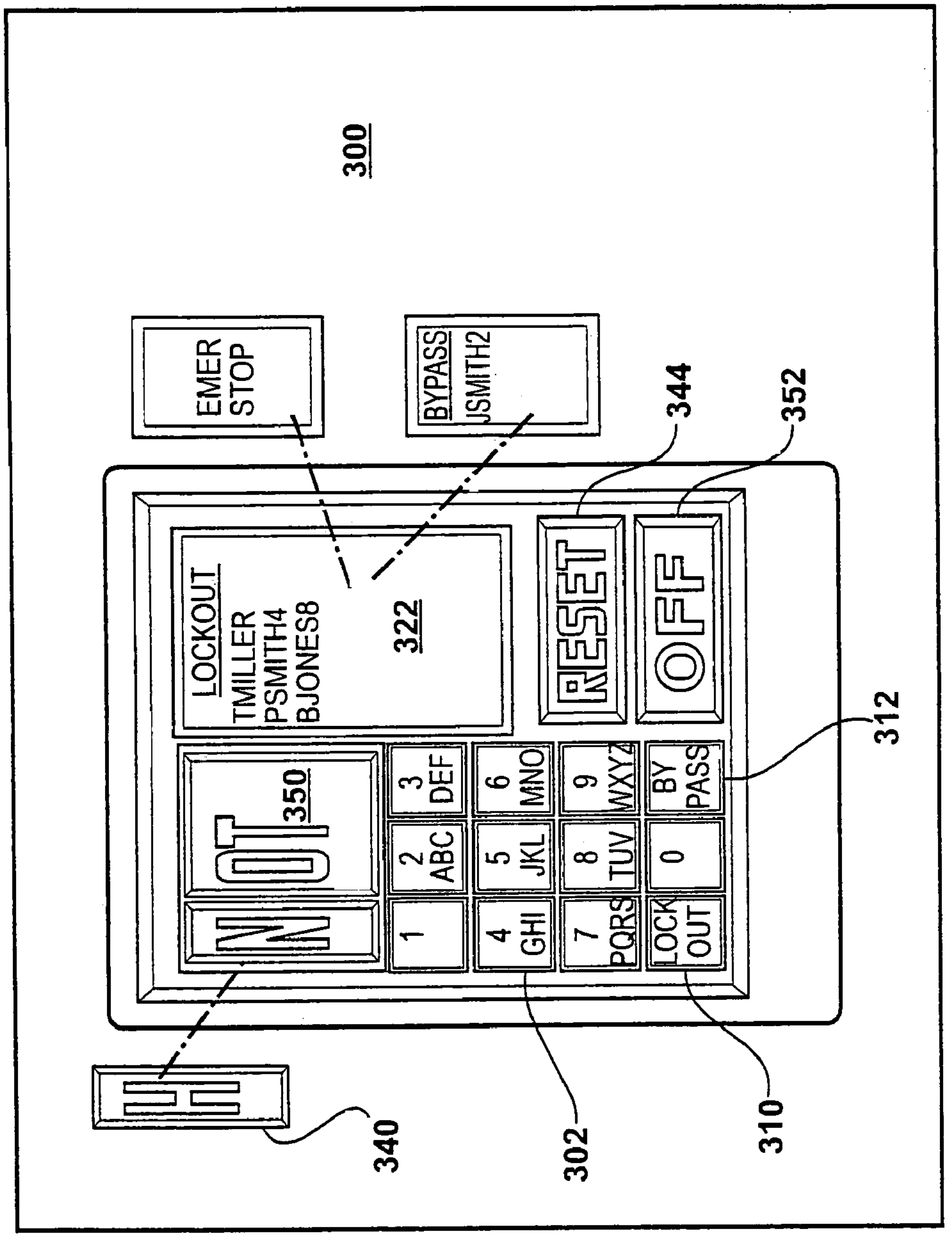
FIG. 3 is a detailed drawing of a user interface of an electrical panel according to the invention.

FIG. 3 is a drawing which better illustrates the interface 300 in conjunction with modular power switches and devices according to the invention. The panel 300 includes a keypad 302 and accompanying display 322 used to perform access and monitoring functions. Access to the panel can only be gained through some electronic facility, such as keypad or ID card swiping 350. Authorized personnel will use their badge or keypad to enter a password, then press lockout button 310. Having completed this function, their name (and/or encoded identification) will appear on the lockout screen of display 322) and a HOT/NOT display 340 will change from HOT to NOT, indicating that power has been interrupted from the panel, allowing maintenance to proceed with high voltage removed.

When the last authorized person swipes at 350 or manually enters with ID pad 302, and presses reset button 344, the powered disconnect will be reinstated, and the HOT/NOT display will switch to HOT. If the authorized person must work in the cabinet with the power on, they will first swipe or manually input their password and press the BYPASS button 312. This will allow the person to open the doors of the cabinet with the power on. When such personnel has completed working in the panel, they will close the door(s) which removes their I.D. from the display 322.

Note that, with the display keeping track of all personnel access (preferably stored in a nonvolatile memory), it will be clear to management who has gained access to the panel, and when such access occurred. Moreover, in the event that someone fails to reset the panel as required, such information will be clearly evident to permit appropriate reprimand. Depressing the OFF pushbutton 352 will open switch 226, and the HOT/NOT display will switch to NOT.

Figure 4:
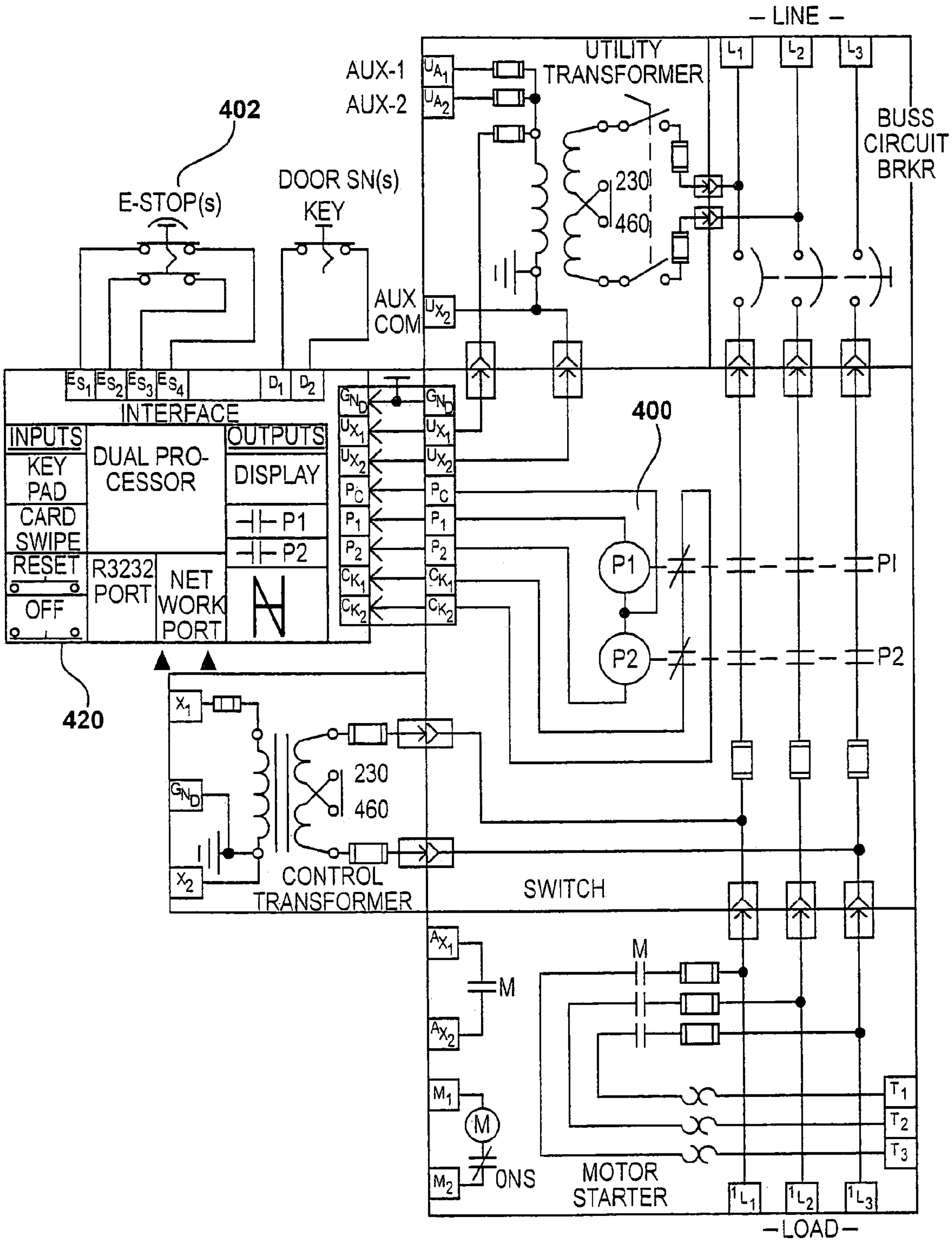
FIG. 4 is a schematic block diagram of certain electrical interconnections within an electrical panel built in accordance with this invention.

FIG. 4 is a schematic diagram which shows how the control and power devices are configured in ladder-diagram form. FIG. 4 also shows a relationship between inputs, outputs and control processor 420 through various interface ports.

In the preferred embodiment, the higher-voltage switches and control functions are segregated, such as in the upper right hand comer of the unit, with lower-voltage signals being routed to and through the control interface unit relative to the power buss (L1, L2, L3). In this way, certain devices such as motor starters and other components, may interlock onto (and cover up) the high-voltage lines, thereby preferably creating a finger-safe environment for maintenance personnel.

Power will be removed and reinstated through the use of switches P1 and P2 400, which may take the form of any control switch according to the invention, including solid-state devices. In fact, the main switches 400 may be implemented in a number of forms, namely, electromechanical, which includes coil-switched contacts, signal pulses or wave forms, electronic form solid-state gated devices, as may be derived through silicon-controlled rectifiers (SCR), tiracs, power FETs and the like, contactors, and double molded circuit-breakers with a shunt trip. It is the intention of this claim to provide redundant and self checking signals to comply with ANSI requirements for control reliability.

It should be noted that regardless of implementation, switches P1 and P2 400 will be "force guided," in the sense that neither will open without all opening, so that there can never be a failure in one leg of the line. This is in accordance with ANSI standards, which does not allow for a single component failure in an integrated safety device, to interfere with full shut down.

Also in accordance with the ANSI standard, the door of the panel cannot be opened without turning off power in much the same way as E-stops switches 402 interrupt the line. Note, however, that in contrast to previous designs, the emergency stop or E-stop function in this case is a true E-stop function, since power is turned off as early as possible up the line, rather than through some mechanism between the panel and the operator. With such a configuration, workers and operators on the line will be forced to use the E-stop control only for an emergency stop condition, since recreational use will shut down more than their own equipment, which is the way emergency stop functionality was originally intended to operate. Programming will be derived through the RS232 port or plant network, as described previously.

Figure 5:
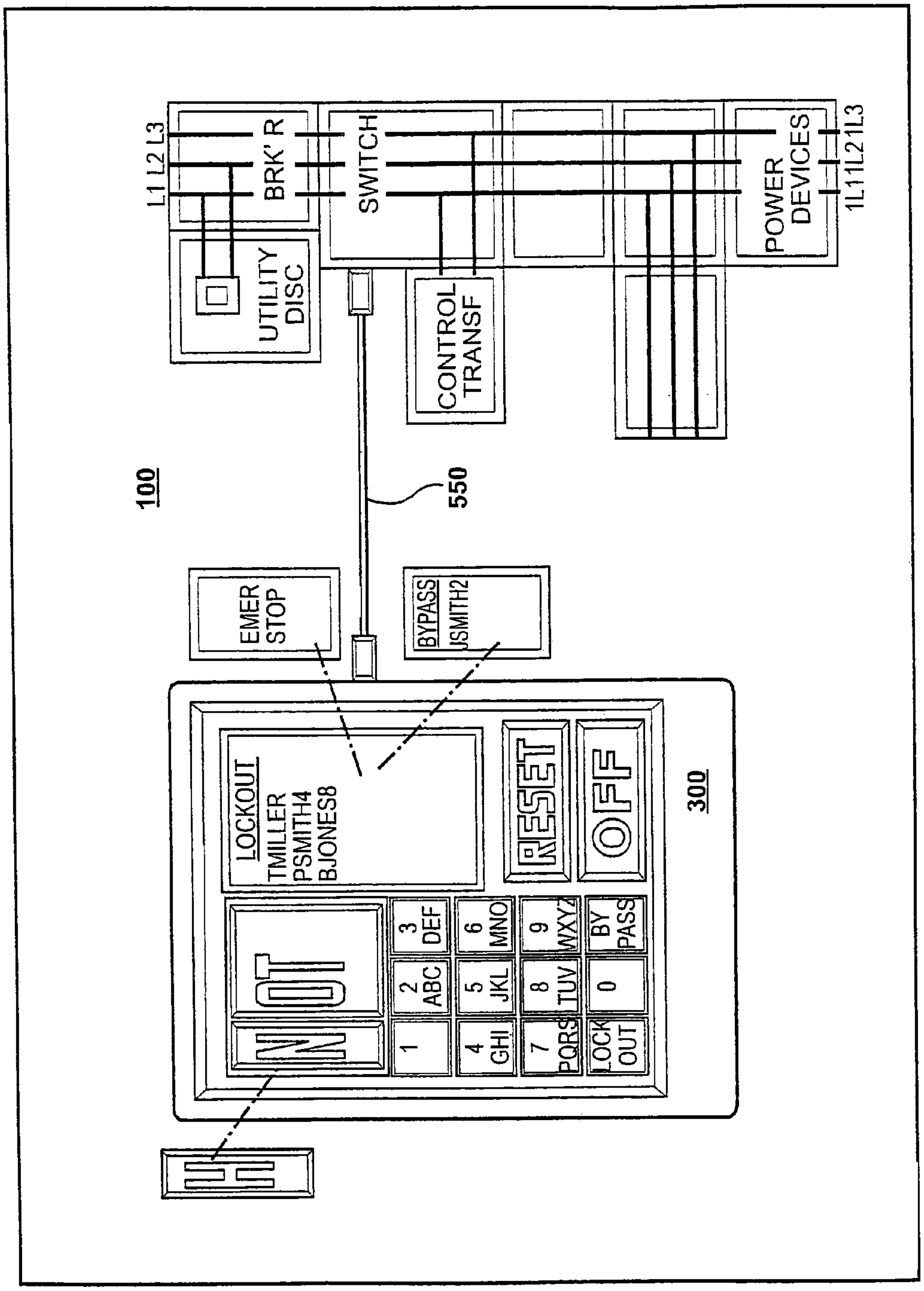
FIG. 5 is a block diagram of the full system.

FIG. 5, shows how the interface 300 is coupled to modular power buss 200 through a connection cable 550. As better understood with reference to FIG. 4, this modular power buss 200 includes a switch section including a disconnect block 210 and a lower section including power devices which are preferably interlocked onto the high-voltage buss in modular fashion.

We claimed:

1. A power disconnect controller for an electrical access panel including a power buss, the controller comprising:
   - one or more electrical switches operative to interrupt and reinstate power along the power buss;
   - a user interface including capability for entry of an access code, and a status monitor; and wherein the user interface is in electrical communication with the one or more electrical switches to implement one or more functions in conjunction with the entry of the access code by one or more authorized users wherein the one or more functions include;

a LOCKOUT function wherein power is interrupted along the power buss and the one or more authorized users lockout others from reinstating power along the power buss, and a RESET function wherein power is reinstated along the power buss.

2. The power disconnect controller of claim 1, wherein:

the user interface includes a keypad; and the access code is entered through the keypad.

3. The power disconnect controller of claim 1, wherein:

the user interface includes an electronic card reader; and the access code is entered through the card reader.

4. The power disconnect controller of claim 1, wherein the status monitor is a screen which displays an indication for each of the one or more authorized users implementing the LOCKOUT and RESET functions.

5. The power disconnect controller of claim 1, wherein the one or more electrical switches are implemented with electromechanical devices.

6. The power disconnect controller of claim 1, wherein the one or more electrical switches are implemented with solid-state electronic devices.

7. The power disconnect controller of claim 1, further including an interface to one or more emergency stop switches each configured to present respective emergency stop signals, the receipt of which causes the one or more electrical switches to interrupt power along the buss.

8. The power disconnect controller of claim 1, wherein:

the electrical access panel includes one or more doors with door sensors; and the unauthorized opening of one or more of the doors causes the one or more electrical switches to interrupt power along the buss.

9. The power disconnect controller of claim 1, wherein the power buss and the one or more electrical switches are physically segregated within the panel.

10. The power disconnect controller of claim 1, further including one or more electrical modules which interlock onto the power buss and make connection thereto in a finger-safe manner.

11. The power disconnect controller of claim 1, further including a status display which indicates when power along the power buss is interrupted and when power along the power buss is active.

12. The power disconnect controller of claim 11, wherein the status display shows NOT when power along the power buss is interrupted and HOT when power along the power buss is active.

13. The power disconnect controller of claim 1, wherein the RESET function reinstates power along the power buss in conjunction with the entry of the access code by all of the one or more authorized users that have entered the LOCKOUT function.

14. A power disconnect controller for an electrical access panel including a power buss, the controller comprising:

one or more electrical switches operative to interrupt and reinstate power along the power buss;

a user interface including capability for entry of an access code, and a status monitor; and wherein the user interface is in electrical communication with the one or more electrical switches to implement one or more functions in conjunction with the entry of the access code by one or more authorized users wherein the one or more functions include;

a LOCKOUT function, whereby power is interrupted along the power buss, and a RESET function, whereby power is reinstated along the power buss;

the electrical access panel includes one or more doors with door sensors; and the unauthorized opening of one or more of the doors causes the one or more electrical switches to interrupt power along the buss;

wherein the user interface further includes a BYPASS function allowing power to be on along the buss when one or more of the doors are open.

15. A power disconnect controller for an electrical panel including a power buss, an access door and an emergency stop interface to one or more emergency stop buttons, the controller comprising:

one or more electrical switches operative to interrupt and reinstate power along the buss;

a user interface including capability for entry of an access code, and a status monitor; and wherein the controller is operative to implement the following functions:

a LOCKOUT function, whereby power is interrupted along the buss in conjunction with the entry of the access code by one or more authorized users, a RESET function, whereby power is reinstated along the buss in conjunction with the entry of the access code by all of the one or more authorized users that have entered the LOCKOUT function, an emergency stop function configured to cause the one or more electrical switches to interrupt power along the buss upon loss of a signal from an emergency stop button, and an access door open function configured to cause the one or more electrical switches to interrupt power along the buss upon sensing an unauthorized opening of the access door.

16. The power disconnect controller of claim 15, wherein:

the user interface includes a keypad; and the access code is entered through the keypad.

17. The power disconnect controller of claim 15, wherein:

the user interface includes an electronic card reader; and the access code is entered through the card reader.

18. The power disconnect controller of claim 15, wherein the status monitor is a screen which displays an indication for each of the one or more authorized users implementing the LOCKOUT and RESET functions.

19. The power disconnect controller of claim 15, wherein the one or more electrical switches are implemented with electromechanical devices.

20. The power disconnect controller of claim 15, wherein the one or more electrical switches are implemented with solid-state electronic devices.

21. The power disconnect controller of claim 15, wherein the user interface further includes a BYPASS function allowing power to be on along the buss when the access door is open.

22. The power disconnect controller of claim 15, wherein the power buss and the one or more electrical switches are physically segregated within the panel.

23. The power disconnect controller of claim 15, further including one or more electrical modules which connect onto the power buss and make connection thereto in a finger-safe manner.

24. The power disconnect controller of claim 15, further including a status display which indicates when power along the power buss is interrupted and when power along the power buss is active.

25. The power disconnect controller of claim 24, wherein the status display shows NOT when power along the power buss is interrupted and HOT when power along the power buss is active.

26. A power disconnect controller for an electrical panel including a power buss, an access door and an emergency stop interface to one or more emergency stop buttons, the controller comprising:

one or more electrical switches operative to interrupt and reinstate power along the buss;

a user interface including capability for entry of an access code, and a status monitor; and wherein the controller is operative to implement the following functions:

a) a LOCKOUT function, whereby power is interrupted along the buss in conjunction with the entry of the access code by one or more authorized users, b) a RESET function, whereby power is reinstated in conjunction with the entry of the access code by all of the one or more authorized users that have exited the LOCKOUT function, c) an emergency stop function configured to cause the one or more electrical switches to interrupt power along the buss upon receipt of a signal from an emergency stop button, d) an access door open function configured to cause the one or more electrical switches to interrupt power along the buss upon sensing an unauthorized opening of the access door, e) a BYPASS function that allows power to be on along the buss when the access door is open, and f) display, on the status monitor:

each of the one or more authorized users implementing the LOCKOUT and RESET functions, the occurrence of an emergency stop condition, and the unauthorized opening of the access door.

27. The power disconnect controller of claim 26, wherein:

the user interface includes a keypad; and the access code is entered through the keypad.

28. The power disconnect controller of claim 26, wherein:

the user interface includes an electronic card reader; and the access code is entered through the card reader.

29. The power disconnect controller of claim 26, wherein the one or more electrical switches are implemented with electromechanical devices.

30. The power disconnect controller of claim 26, wherein the one or more electrical switches are implemented with solid-state electronic devices.

31. The power disconnect controller of claim 26, wherein the power buss and the one or more electrical switches are physically segregated within the panel.

32. The power disconnect controller of claim 26, further including one or more electrical modules which connect onto the power buss and make connection thereto in a finger-safe manner.

33. The power disconnect controller of claim 26, wherein the status monitor shows NOT when power along the buss is interrupted and HOT when power along the buss is active.

34. For use in a personnel safety lockout system, a power disconnect controller, the controller comprising:

one or more electrical switches operative to interrupt and reinstate power along a power buss; and one or more user interfaces, wherein the one or more user interfaces are in electrical communication with the one or more electrical switches to implement one or more safety lockout functions wherein power is interrupted along the power buss and one or more authorized users lockout others from reinstating power along the power buss, and one or more power on functions wherein power is reinstated along the buss.

35. The controller of claim 34, wherein the one or more user interfaces include capability for entry of an access code by one or more authorized users.

36. The controller of claim 35, further including a status monitor having a display that indicates when power is interrupted along the buss and when power is on along the buss, and a screen which displays an indication for each of the one or more authorized users implementing the one or more safety lockout functions.

37. The controller of claim 35, wherein the user interface includes at least one of a keypad and the access code is entered through the keypad, and a reader and the access code is entered through the reader.

38. The controller of claim 34, further including one or more emergency stop switches remote from the one or more electrical switches, in electrical communication with the one or more electrical switches, and operative to interrupt power along the power buss as a true emergency stop function.

39. The power disconnect controller of claim 34 wherein one or more of the user interfaces are remote from the one or more electrical switches.

* * * * *